Aug. 9, 1966  J. STALEY  3,264,978
ROTARY EMBOSSING MACHINES
Filed Aug. 11, 1964  2 Sheets-Sheet 1
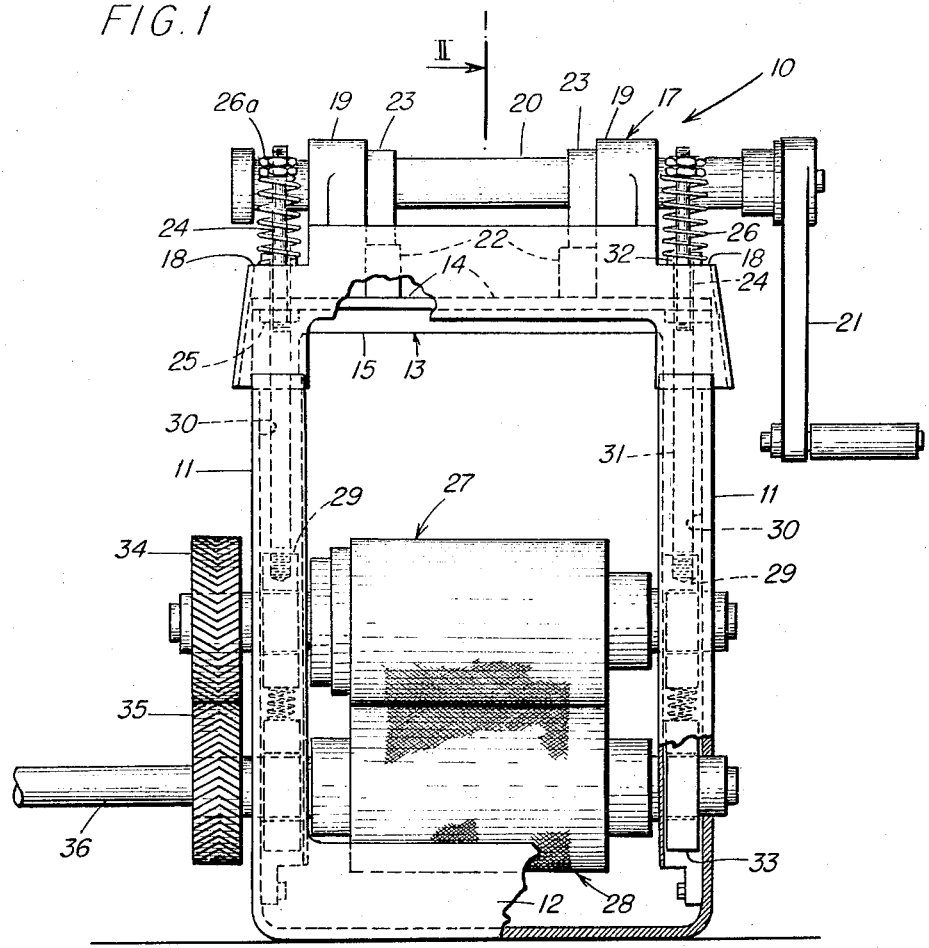
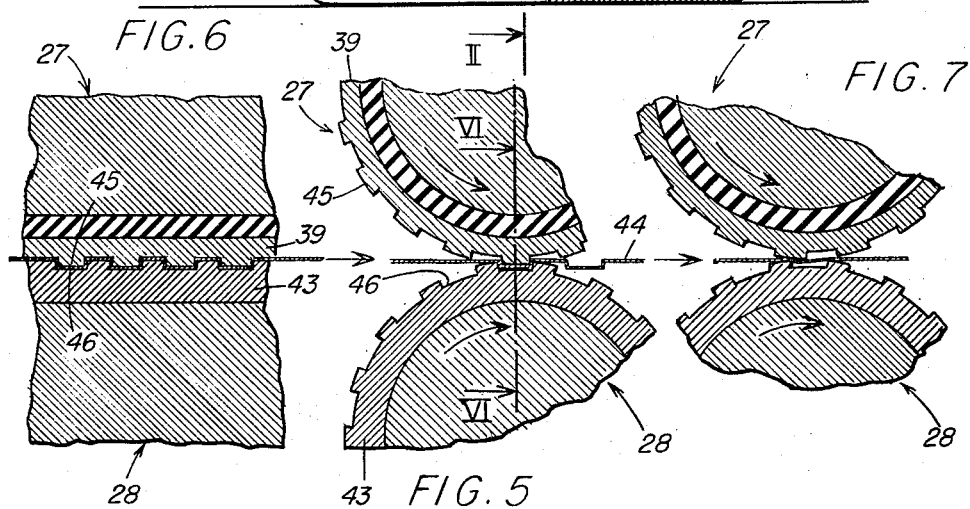

Aug. 9, 1966     J. STALEY     3,264,978
ROTARY EMBOSSING MACHINES
Filed Aug. 11, 1964     2 Sheets-Sheet 2
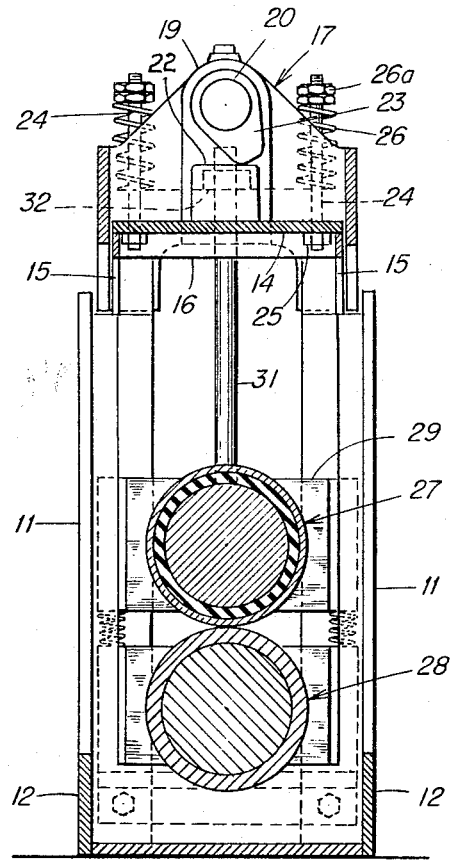
FIG. 2
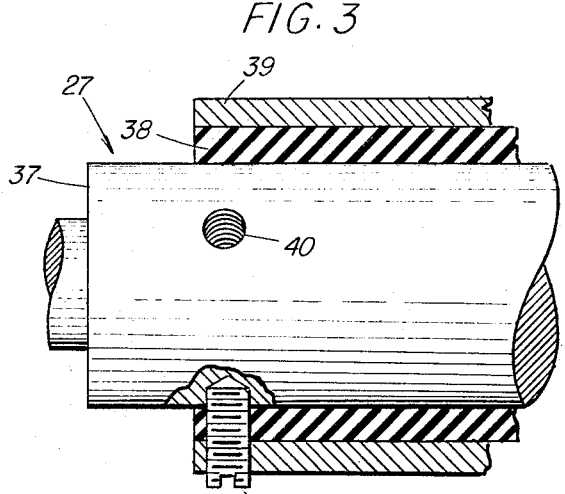
FIG. 3
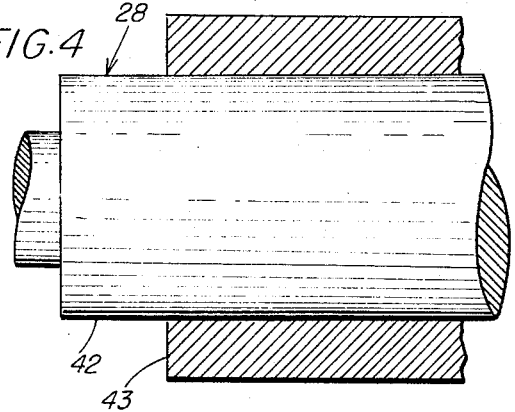
FIG. 4
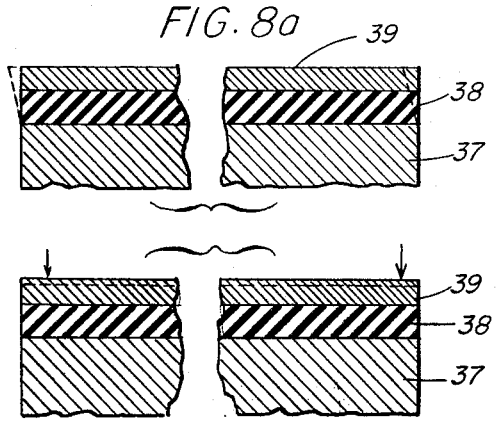
FIG. 8a
FIG. 8b
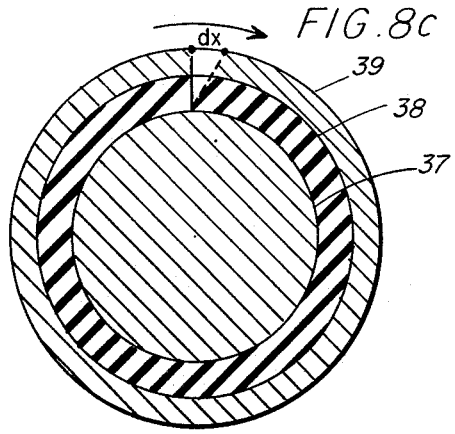
FIG. 8c

United States Patent Office 3,264,978
Patented August 9, 1966

3,264,978
ROTARY EMBOSSING MACHINES
John Staley, Richmond, Va., assignor to Philip Morris Incorporated, New York, N.Y., a corporation of Virginia
Filed Aug. 11, 1964, Ser. No. 388,864
1 Claim. (Cl. 101—23)

This invention relates to embossing machines and refers more particularly to improved embossing rolls for use in such machines, and more specifically embossing rolls which eliminate possible misregistration of the die elements carried thereby.

In conventional embossing machines, raised figures or other patterns are produced on plane strip material (leather, paper, cardboard, metal, textiles, etc.) by feeding the strip through a pair of embossing rollers having complementally engraved embossing surfaces or carrying male and female die elements. The roller surfaces or die elements are generally die-matched or engraved under a no load condition so that they exert little or no pressure on the strip during embossing and maintain exact registration with facility. However, when materials such as glassine, which is a highly plasticized, cellulosic paper are embossed, an appreciable force has to be exerted on the embossing rollers to enable the die elements to penetrate the material. This pressure tends to cause deflection in the roller assembly and also takes up any "lost motion" due to wear in the die elements, roller drive gears, or both. This lost motion may cause the gears to mesh at a pitch line other than that at which the die engraving was performed. If the pitch line changes, one gear becomes retarded in relation to the other and the die element of one roller lags with respect to the other causing misregistration. This effect is accentuated by the use of a very fine embossing pattern, small rollers and a coarse gear pitch relative to the pattern size.

For example, if the relative movement between the die elements is only as large as 0.0019″–0.002″ when a solid lettering pattern is included in the overall embossing pattern, the fine embossing pattern eats into the unembossed portion of the lettering. Thus, the need for perfect die element registration makes the maintenance of perfectly registered embossing rollers a necessity, something that cannot be done with prior art steel rollers when embossing hard materials such as glassine. In the prior art "lost motion" was minimized in embossing machines by using more precise machining, improving roller support bearings, or by increasing embossing depths. Another expedient involved using herringbone drive gears for driving the embossing rollers to prevent axial misregistration. However, none of these prior art constructions have fully succeeded in eliminating the problem of die element misregistration in embossing machines.

It is, therefore, the primary objective of the present invention to provide an improved embossing roller for use in embossing machines.

Another object is to provide an embossing roller for use in embossing machines which in use eliminates misregistration of the die element thereon with the die element carried on a companion embossing roller.

Another object is to provide an embossing roller on which the die element carried thereby may move relative to the roller core so as to "find" and register perfectly with the die element carried by a companion embossing roller regardless of the "lost motion" occurring between the two embossing rollers.

A further object is to provide an improved embossing roller construction for embossing highly plasticized materials such as glassine.

Other objects of the present invention will become apparent during the course of the following specification.

In achieving the aforementioned objectives of the present invention it was found advantageous to make at least one embossing roller of a pair of embossing rollers in an embossing machine of a composite construction comprised of a rigid cylindrical core, a resilient sleeve mounted on the core and being bonded thereto, and a rigid or metallic sleeve mounted on the resilient sleeve and also being bonded thereto. The outer surface of the rigid sleeve is preferably engraved with the embossing pattern so as to constitute one of the die elements which emboss the material. In this manner, the outer or rigid sleeve is free to have some movement in axial, radial, and circumferential directions relative to the rigid core. Thus the die element on the roller is free to move sufficiently to "seek and find" the matching surfaces of the die element carried on the other or companion embossing roller, thereby insuring perfect die element registration although "lost motion" within normal limits may exist between the two embossing rollers during rotation.

The invention will appear more clearly from the following detailed description when taken in conjunction with the accompanying drawings showing by way of example, a preferred embodiment of the inventive concept.

In the drawings:
FIGURE 1 is a front elevational view of an embossing machine provided with an embossing roller constructed in accordance with the principles of the present invention, some parts being shown in section;
FIGURE 2 is a sectional view as taken along line II—II in FIGURE 1;
FIGURE 3 is a fragmentary view, partly in section and on enlarged scale, of an end portion of one of the pair of embossing rollers;
FIGURE 4 is similar to FIGURE 3 illustrating the construction of the other roller in the pair of embossing rollers;
FIGURE 5 is a fragmentary radial sectional view showing the male and female die elements carried on the embossing rollers properly registering one with the other, the die elements being shown in exaggerated size for sake of clarity;
FIGURE 6 is a fragmentary sectional view on the line VI—VI of FIGURE 5;
FIGURE 7 is the same as FIGURE 5 except it illustrates a misregistration of the die elements;
FIGURES 8a, 8b and 8c are diagrammatic representations showing the directions in which the metallic sleeve may move relative to the cylindrical core in order to effect perfect registration of the die elements.

Throughout the specification like reference numerals are used to indicate like parts.

Referring in detail to FIGURES 1 and 2 of the drawings, the embossing machine 10 is a known type in general arrangement, and may include a main frame comprised of a number of corner upright standards 11 interconnected at the bottom by vertical walls 12 which may be integral with the standards as shown. A subframe 13 is supported (preferably rigidly connected) on top of the main frame and preferably includes a rectangular crown plate 14, longitudinal side legs 15 supporting the crown plate and resting on the standards, and transverse skirts 16 extending between the side legs. Enclosing the subframe 13 and supported on the uprights 11 for vertical movement is a bridge-like housing 17 having outstanding shoulders 18 at each end and bearing blocks 19 for rotatably supporting a shaft 20, the shaft being rotated by means of hand crank 21. Subframe 13 is provided with a number of camming blocks 22 against which operate cams 23 carried by the shaft 20 for raising up vertically the bridge housing 17 when hand crank 21 is turned. A number of vertical studs 24 extend through subframe 13 and are retained on the underside of crown plate 14 by nuts 25, the studs also extending upwardly through the shoulders 18 on bridge housing 17 and being enclosed by compression springs 26 bearing against the shoulders and nuts 26a at the top of the studs. Thus the bridge housing in being raised vertically, compresses springs 26 so that the bridge housing is urged back down onto the standards after the cams ride off the camming blocks. The purpose of raising up bridge housing 17 is to vertically raise upper embossing roller 27 to permit initially feeding the strip material to be embossed into the nip of roller 27 and lower embossing roller 28. Upper roller 27 is journaled in bearing blocks 29 which are vertically slidable and guided in channels 30 of the standards 11, the bearing blocks being connected to the lower ends of vertical rods 31 which are fixed at their upper ends on the upper side of the shoulders 18 of bridge housing 17 by means of nuts 32 bearing against the shoulders.

Lower embossing roller 28 is also journaled in bearing blocks 33 riding in channels 30 of the standards, and the rollers are powered by a herringbone gear set 34, 35 driven by drive shaft 36.

The present invention contemplates improvements in embossing machines which permits a relaxation in the criticality of bearing construction, machining procedures, etc. with little hazard of destroying or damaging the die elements during normal operation due to misregistration. To that end at least one of the embossing rollers, preferably upper embossing roller 27 is provided so as to have possibility of some movements axially, radially and circumferentially in its outer or die element surface relative to its center or fixed rotating axis. Thus, embossing roller 27 comprises a rigid, preferably metallic core 37, an intermediate cylindrical sleeve 38 of a resilient material, and an outer rigid, preferably metallic sleeve 39. In practice, the embossing roller may be constructed advantageously by tapping a number of radially directed holes 40 in core 37 adjacent the ends thereof and adapted to receive set screws 41. Intermediate sleeve 38 which is preferably neoprene rubber or similar elastomer type material is then applied to the core and outer rigid sleeve 39 is applied to sleeve 38. Set screws 41 are then inserted in the rigid sleeve 39 through suitably tapped holes therein and screwed down tight into holes 40 in the core, the set screws being used to facilitate assembly and insure the proper positioning of rigid sleeve 39 relative to the core until the bond between the rubber sleeve and the outer sleeve and core sets tight. The rubber sleeve 38 may be cemented or vulcanized to the core and rigid sleeve.

As shown in FIGURE 4, lower embossing roller 28 preferably comprises a rigid core 42 on which is mounted a metallic sleeve 43 which may be rigidly fixed for rotation with core 42 by means of a shrink fit or other known connection. The sleeve 43 and outer rigid sleeve 39 of roller 27 may be suitably engraved with matching male and female die elements of the pattern to be embossed in the strip material 44 (FIGS. 5–7). Upon completion of the engraving of the rollers, the set screws 41 are removed from embossing roller 27 since, obviously, they have served their purpose in facilitating assembly and engraving. FIGURE 5 is a partial radial section illustrating the proper radial registration of the male die element surfaces 45 on sleeve 39 of embossing roller 27 with the companion female die element surfaces 46 on sleeve 43 of roller 28. FIGURE 6 illustrates proper axial registration of the die elements. On the other hand, FIGURE 7 illustrates what occurs when the die elements undergo misregistration as for example that caused by one roller (28) being slightly advanced relative to the other roller (27). This misregistration will, however, be remedied due to the outer sleeve 39 being able to move circumferentially relatively to core 37 with sufficient advance to permit its male die element to "seek and find" the corresponding surfaces on the female die element. The dimensions of the parts or areas 45 and 46 are shown in FIGURES 5 to 7 on a larger or exaggerated scale from what would be a common actual embodiment of the invention. For example, the principles are particularly advantageous in applying fine embossing to metal foil paper or glassine in which the protrusions on the male die surface and the indentations in the female die surface are generally of circular or other configuration and are arranged at about twenty thousandths of an inch center to center.

The movements which sleeve 39 of roller 27 may make relative to the core 37 are illustrated in FIGURES 8a to 8c. If there is axial misregistration between the die elements, the outer die element surface of sleeve 39 may displace relative to core 37, from the position shown in solid lines, FIGURE 8a, to the position shown in dashed lines thus allowing the die elements to properly register. Similarly, as shown in FIGURE 8b the outer surface of sleeve 39 may move radially inwardly to the position shown in dashed lines, and as seen in FIGURE 8c, a point on the outer surface may displace circumferentially of the core by the distance $dx$.

Obviously, the outer sleeve 39 may also displace relative to its core for providing proper registration of the die elements, with movements which are a combination of radial, circumferential and axial displacements.

From the foregoing it will be readily apparent that the embossing roller of the present invention offers a number of improvements over prior art roller construction. It eliminates the problem of die element misregistration, insures perfect embossing of the strip material and lends itself to ready modification of existing roller types.

While there is above disclosed but one embodiment of the embossing roller of the present invention, it is possible to produce still other embodiments without departing from the scope of the inventive concept herein disclosed.

What is claimed is:

In an embossing machine which includes first and second embossing rolls rotatable about parallel spaced axes and each carrying one die element of a matched die set, the die elements being adapted normally to register one with the other when said embossing rolls are rotated with the die element on one of said embossing rolls traversing a fixed path of rotation about the axis of said one embossing roll, the improvement wherein the other of said embossing rolls comprises an assembly of a cylindrical core member, a cylindrical sleeve of resilient material enclosing said core member and bonded to the outer surface thereof, and a metallic sleeve coextensive with and enclosing said resilient sleeve, said resilient sleeve being bonded to the inner surface of said metallic sleeve, the outer surface of said metallic sleeve being engraved and constituting one of said die elements, said resilient sleeve being deformable on misregistration of said die elements to admit axial, circumferential and radial displacements of said metallic sleeve relative to said core member whereby the die element on the surface of said metallic sleeve is maintained in matching register with the die element on the other of said embossing rolls.

References Cited by the Examiner

UNITED STATES PATENTS

| 482,267 | 9/1892 | Newton | 101—23 |
| 1,883,187 | 10/1932 | Weber | 101—28 |
| 2,065,189 | 12/1936 | Ladd. | |

FOREIGN PATENTS 276,698  8/1930  Italy.

ROBERT E. PULFREY, *Primary Examiner.*

NATHANIEL A. HUMPHRIES, WILLIAM F. McCARTHY, *Assistant Examiners.*